United States Patent
Kim

(10) Patent No.: US 9,495,045 B2
(45) Date of Patent: Nov. 15, 2016

(54) COORDINATE INDICATING APPARATUS AND COORDINATE MEASUREMENT APPARATUS FOR MEASURING INPUT POSITION OF COORDINATE INDICATING APPARATUS

(71) Applicant: Samsung Electronics Co., Ltd., Gyeonggi-do (KR)

(72) Inventor: Gwan-Hyung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/857,713

(22) Filed: Apr. 5, 2013

(65) Prior Publication Data

US 2013/0300708 A1  Nov. 14, 2013

(30) Foreign Application Priority Data

May 11, 2012 (KR) .......... 10-2012-0050371

(51) Int. Cl.
*G06F 3/044* (2006.01)
*G06F 3/041* (2006.01)
*G06F 3/0354* (2013.01)

(52) U.S. Cl.
CPC .......... *G06F 3/044* (2013.01); *G06F 3/03545* (2013.01); *G06F 3/0416* (2013.01); *G06F 2203/04104* (2013.01); *G06F 2203/04106* (2013.01)

(58) Field of Classification Search
CPC .. G06F 3/044; G06F 3/03545; G06F 3/0416; G06F 2203/04106; G06F 2203/04104
USPC .......... 345/179, 174–17; 178/18.06
See application file for complete search history.

(56) References Cited

U.S. PATENT DOCUMENTS

| | | | |
|---|---|---|---|
| 5,790,106 A * | 8/1998 | Hirano et al. | 345/179 |
| 6,515,654 B1 * | 2/2003 | Liao | G06F 3/03545 178/18.01 |
| 8,022,317 B2 * | 9/2011 | Ely | 345/179 |
| 2005/0162411 A1 * | 7/2005 | Berkel van | 345/179 |
| 2008/0122801 A1 * | 5/2008 | Ko | G06F 3/046 345/174 |
| 2008/0150916 A1 | 6/2008 | Vos | |
| 2010/0013792 A1 * | 1/2010 | Fukushima | G06F 3/03547 345/174 |
| 2011/0122087 A1 * | 5/2011 | Jang et al. | 345/179 |

(Continued)

FOREIGN PATENT DOCUMENTS

EP  2 325 736 A2  5/2011

*Primary Examiner* — Kumar Patel
*Assistant Examiner* — Amy C Onyekaba
(74) *Attorney, Agent, or Firm* — Jefferson IP Law, LLP

(57) ABSTRACT

A coordinate measurement system including a coordinate indicating apparatus and a coordinate measurement apparatus for determining a position of a contact object including the coordinate indicating apparatus. The coordinate measurement apparatus includes a channel electrode unit including one or more electrodes, wherein capacitance of each of the one or more electrodes or capacitance between the one or more electrodes is changed based on a change in the position of the contact object, and a controller for applying an electrical signal to the channel electrode unit or measuring a reception signal input to the channel electrode unit. The coordinate indicating apparatus includes a conductive tip for forming capacitance with the one or more electrodes of the channel electrode unit, and a resonant circuit unit for generating identification information of the coordinate indicating apparatus, wherein the resonant circuit unit is connected to the conductive tip.

26 Claims, 12 Drawing Sheets

(56) References Cited

U.S. PATENT DOCUMENTS

| | | | |
|---|---|---|---|
| 2011/0155479 A1* | 6/2011 | Oda et al. | 178/18.06 |
| 2011/0298421 A1* | 12/2011 | Palay et al. | 320/108 |
| 2012/0050207 A1* | 3/2012 | Westhues et al. | 345/179 |
| 2013/0285990 A1* | 10/2013 | Park | G06F 3/046 345/179 |
| 2014/0104224 A1* | 4/2014 | Ih | G06F 3/044 345/174 |

* cited by examiner

COORDINATE INDICATING APPARATUS AND COORDINATE MEASUREMENT APPARATUS FOR MEASURING INPUT POSITION OF COORDINATE INDICATING APPARATUS

PRIORITY

This application claims priority under 35 U.S.C. §119(a) to Korean Application filed in the Korean Intellectual Property Office on May 11, 2012 and assigned Serial No. 10-2012-0050371, the entire disclosure of which is incorporated herein by reference.

BACKGROUND OF THE INVENTION

1. Field of the Invention

The present invention relates generally to a coordinate indicating apparatus and a coordinate measurement apparatus for measuring an input position of the coordinate indicating apparatus, and more particularly, to a coordinate indicating apparatus such as a finger or a stylus pen and a coordinate measurement apparatus for measuring an input position of the coordinate indicating apparatus.

2. Description of the Related Art

Currently, devices such as a smart phone and tablet PC are actively under development with capability for a contact position measurement apparatus embedded therein. Specifically, the smart phone or the tablet PC generally includes a touch screen, and a user designates a particular coordinate of the touch screen by using a finger or a stylus pen. The user inputs a particular signal in the smart phone by designating the particular coordinate of the touch screen.

The touch screen may recognize input based on electricity, infrared light, ultrasonic waves and the like. For example, an electricity based device includes a Resistive type touch screen (R type touch screen) or a Capacitive type touch screen (C type touch screen). Among touch screens, the R type touch screen capable of recognizing a user's finger and a stylus pen has been widely used, but the R type touch screen is problematic in that there is screen glare due to an air space between Indium Tin Oxide (ITO) layers. More specifically, transmissivity of light penetrating a display is reduced due to the air space between the ITO layers, and external light reflection is increased.

Currently, the C type touch screen is also widely applied. The C type touch screen operates by detecting a difference in capacitance of a transparent electrode generated by a contact of an object. However, the C type touch screen has difficulty in physically distinguishing between a hand and a pen, resulting in an unintended operation error by a contact of the hand which may occur when the pen is used.

Software for distinguishing between the hand and the pen according to a contact area and a method including a separate position measurement apparatus such as an Electro Magnetic Resonance (EMR) technique as well as the C type touch screen has been used to solve the contact problem. However, software does not completely resolve the unintended operation error generated due to the contact of the hand, and implementing the method including the separate measurement apparatus increases size, weight, and cost of the device, by requiring additional components.

Therefore, there is a need for a technology capable of performing a determination without operation error when an object such as the stylus pen is used, without using a separate position measurement apparatus.

SUMMARY OF THE INVENTION

Accordingly, an aspect of the present invention is to solve the above-mentioned problems occurring in the prior art, and to provide at least the advantages below. According to an aspect of the present invention a coordinate indicating apparatus and a coordinate measurement apparatus is provided, which determines input positions of a stylus pen and a conductive object while including only a single touch screen. According to a further aspect of the present invention, a coordinate indicating apparatus and a coordinate measurement apparatus is provided, which distinguishes types of contact objects including a stylus pen and other conductive objects, such as a finger.

According to an aspect of the present invention, a coordinate measurement system including a coordinate indicating apparatus and a coordinate measurement apparatus for determining a position of a contact object including the coordinate indicating apparatus is provided. The coordinate measurement apparatus includes a channel electrode unit including one or more electrodes, wherein capacitance of each of the one or more electrodes or capacitance between the one or more electrodes is changed based on a change in the position of the contact object, and a controller for applying an electrical signal to the channel electrode unit or measuring a reception signal input to the channel electrode unit. The coordinate indicating apparatus includes a conductive tip for forming capacitance with the one or more electrodes of the channel electrode unit, and a resonant circuit unit for generating identification information of the coordinate indicating apparatus, wherein the resonant circuit unit is connected to the conductive tip, wherein the controller determines an input position of the contact object based on a change in the capacitance of each of the one or more electrodes or the capacitance between the one or more electrodes, and distinguishes a type of the contact object based on a frequency response characteristic of the reception signal.

According to another aspect of the present invention, a coordinate measurement system including a coordinate indicating apparatus and a coordinate measurement apparatus for determining a position of a contact object including the coordinate indicating apparatus is provided. The coordinate measurement apparatus includes a channel electrode unit including one or more electrodes, wherein capacitance of each of the one or more electrodes or capacitance between the one or more electrodes is changed based on a change in the position of the contact object, a driver for applying an electrical driving signal to the channel electrode unit, a detector for detecting a reception signal of the channel electrode unit, and a controller for determining the position of the contact object and a type of the contact object. The coordinate indicating apparatus includes a resonant circuit for outputting identification information of the coordinate indicating apparatus, wherein the controller determines the position of the contact object based on the reception signal detected by the detector for a first period in which the driver applies the electrical driving signal and determines the type of the contact object based on the reception signal detected by the detector for a second period in which the driver does not apply the electrical driving signal.

According to another aspect of the present invention, a coordinate measurement system including a coordinate indicating apparatus and a coordinate measurement apparatus for determining a position of a contact object corresponding to at least one of the coordinate indicating apparatus and a conductive object is provided. The coordinate measurement apparatus includes a channel electrode unit including one or more electrodes, wherein capacitance of each of the one or more electrodes or capacitance between the one or more electrodes is changed based on a change in the position of the coordinate indicating apparatus, and a controller for applying electrical signals having two or more different frequencies to the channel electrode unit or measuring a reception signal received by the channel electrode unit. The coordinate indicating apparatus includes a resonant circuit for outputting identification information of the coordinate indicating apparatus, wherein the controller determines the position of the contact object from a response characteristic for one frequency and determines at least one of a type of the contact object and a contact pressure from a response characteristic for the other frequency.

According to another aspect of the present invention, a coordinate measurement system including a coordinate indicating apparatus and a coordinate measurement apparatus for determining a position of the coordinate indicating apparatus is provided. The coordinate measurement apparatus includes a channel electrode unit including one or more electrodes, wherein capacitance of each of the one or more electrodes or capacitance between the one or more electrodes is changed based on a change in the position of the coordinate measurement apparatus, a driver for applying an electrical signal to the channel electrode unit, a receiver for receiving the electrical signal from the channel electrode unit, and a controller for determining a contact pressure of the coordinate measurement apparatus. The coordinate indicating apparatus includes a conductive tip for exchanging the electrical signal with the driver, wherein the conductive tip is capacitive-coupled with the channel electrode unit, and a passive circuit connected to the conductive tip, wherein a response characteristic of the passive circuit is changed according to the contact pressure of the coordinate indicating apparatus, wherein the controller measures the contact pressure of the coordinate measurement apparatus based on response characteristics of the passive circuit detected by a detector in two or more different sections of an equal period.

According to another aspect of the present invention, a coordinate measurement system including a coordinate indicating apparatus and a coordinate measurement apparatus for determining a position of a contact object including the coordinate indicating apparatus is provided. The coordinate measurement apparatus includes a channel electrode unit including one or more electrodes, wherein capacitance of each of the one or more electrodes or capacitance between the one or more electrodes is changed based on a change in the position of the contact object, and a controller for applying an electrical signal to the channel electrode unit or measuring a reception signal of the channel electrode unit. The coordinate indicating apparatus includes a conductive tip for forming capacitance with the one or more electrodes of the channel electrode unit, a grounding unit for forming an electrical connection with a user through at least one of a direct contact and a capacitive coupling, a resonant circuit unit connected to the conductive tip, and a switch unit for forming a resonance when a contact pressure of the conductive tip is equal to or higher than a preset threshold, and not forming the resonance when the contact pressure of the conductive tip is lower than the preset threshold.

According to another aspect of the present invention, a coordinate measurement apparatus for determining a position of a contact object corresponding to at least one of a coordinate indicating apparatus and a finger is provided. The coordinate measurement apparatus includes a channel electrode unit including one or more electrodes, wherein capacitance of each of the one or more electrodes or capacitance between the one or more electrodes is changed based on a change in the position of the contact object, and a controller for measuring reception signals from the coordinate indicating apparatus and the channel electrode unit, and distinguishing a type of the contact object based on a frequency response characteristic of the reception signals.

According to another aspect of the present invention, a coordinate indicating apparatus for inputting an input coordinate into a coordinate measurement apparatus having one or more electrodes is provided. The coordinate indicating apparatus includes a conductive tip for forming capacitance with the one or more electrodes, and a resonant circuit unit for receiving resonance energy from the coordinate measurement apparatus through a capacitive coupling, wherein the resonant circuit unit is connected to the conductive tip.

According to another aspect of the present invention, a coordinate measurement system including a coordinate indicating apparatus and a coordinate measurement apparatus for determining a position of the coordinate indicating apparatus is provided. The coordinate measurement apparatus includes a channel electrode unit including one or more electrodes, wherein capacitance of each of the one or more electrodes or capacitance between the one or more electrodes is changed based on a change in a position of the coordinate measurement apparatus, a driver for applying an electrical signal to the channel electrode unit, a receiver for receiving the electrical signal from the channel electrode unit, and a controller for determining a contact pressure of the coordinate measurement apparatus. The coordinate indicating apparatus includes a conductive tip for exchanging the electrical signal with the driver, wherein the conductive tip is capacitive-coupled with the channel electrode unit, a switch unit, wherein an on/off state of the switch unit is determined according to whether a contact between the coordinate indicating apparatus and the coordinate measurement system is performed, and a passive circuit connected to the conductive tip, wherein a response characteristic of the passive circuit is changed according to the state of the switch unit, wherein the controller measures the state of the switch unit based on response characteristics of the passive circuit detected by a detector in two or more different sections of an equal period.

According to another aspect of the present invention, a coordinate measurement system including a coordinate indicating apparatus and a coordinate measurement apparatus for determining a position of a contact object corresponding to at least one of the coordinate indicating apparatus and a finger is provided. The coordinate measurement apparatus includes a channel electrode unit including one or more electrodes, wherein capacitance of each of the one or more electrodes or capacitance between the one or more electrodes is changed based on a change in the position of the contact object, and a controller for applying an electrical signal to the channel electrode unit or measuring a reception signal of the channel electrode unit. The coordinate indicating apparatus includes a conductive tip for forming capacitance with the one or more electrodes, a grounding unit for forming an electrical connection with a user through at least one of a direct contact and a capacitive coupling, and a resonant circuit disposed between the conductive tip and the grounding unit, the resonant circuit having a high-impedance characteristic in a particular resonance frequency, wherein the controller measures response characteristics for resonance frequencies of two or more electrodes in the channel electrode unit and calculates the position of the coordinate indicating apparatus from relative sizes of the response characteristics.

According to another aspect of the present invention, a coordinate measurement system including a coordinate indicating apparatus and a coordinate measurement apparatus for determining a position of a contact object including the coordinate indicating apparatus is provided. The coordinate measurement apparatus includes a channel electrode unit including one or more channel electrodes, a driver for applying an electrical signal to the channel electrode unit, a receiver for receiving the electrical signal from the channel electrode unit, and a controller for determining a contact position of the coordinate measurement apparatus. The coordinate indicating apparatus includes a conductive tip for forming capacitance with the one or more channel electrodes of the channel electrode unit, a passive resonant circuit unit for receiving energy for a resonance through a capacitive coupling between the channel electrode of the channel electrode unit and the conductive tip, and a grounding unit for forming an electrical connection with a user through at least one of a direct contact and the capacitive coupling.

According to another aspect of the present invention, a coordinate measurement system including a coordinate indicating apparatus and a coordinate measurement apparatus for determining a position of a contact object including the coordinate indicating apparatus is provided. The coordinate measurement apparatus includes a channel electrode unit including one or more electrodes, wherein capacitance of each of the one or more electrodes or capacitance between the one or more electrodes is changed based on a change in the position of the contact object, and a driver for applying an electrical signal to the channel electrode unit, a receiver for receiving the electrical signal from the channel electrode unit, and a controller for determining a contact position of the coordinate measurement apparatus. The coordinate indicating apparatus includes a conductive tip for forming capacitance with the one or more electrodes of the channel electrode unit, a passive resonant circuit unit for receiving energy for a resonance through a capacitive coupling between the electrode of the channel electrode unit and the conductive tip, and a grounding unit for forming an electrical connection with a user through at least one of a direct contact and the capacitive coupling.

BRIEF DESCRIPTION OF THE DRAWINGS

The above and other aspects, features and advantages of various embodiments of the present invention will be more apparent from the following detailed description taken in conjunction with the accompanying drawings, in which.

DETAILED DESCRIPTION OF EMBODIMENTS OF THE PRESENT INVENTION

Figure 1:
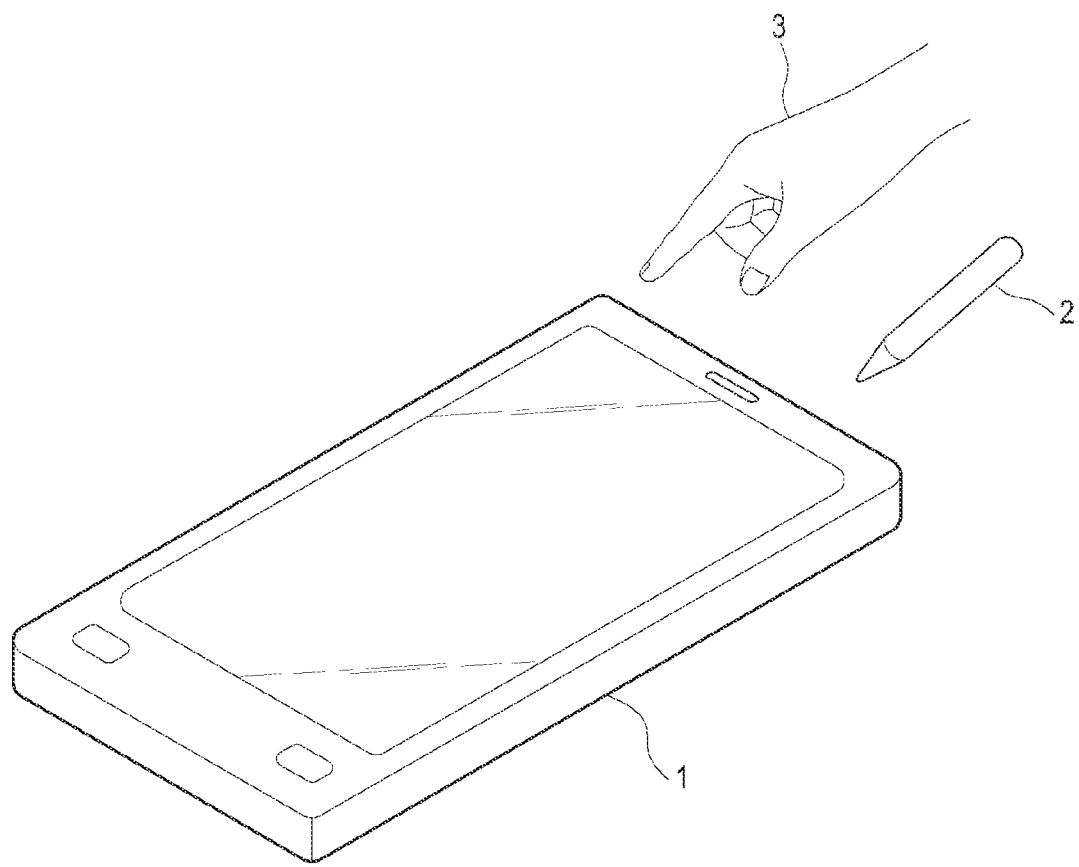
FIG. 1 is a diagram illustrating a coordinate indicating system according to an embodiment of the present invention.

Hereinafter, various embodiments of the present invention will be described in detail with reference to the accompanying drawings. In the following description, the same or like elements are designated by the same or like reference numerals throughout the drawings. Further, detailed description of known functions and configurations is omitted to avoid obscuring the subject matter of the present invention.

According to aspects of the present invention, a coordinate indicating apparatus and a coordinate measurement apparatus which determines input positions of a stylus pen and a conductive object while including only a single touch screen is provided. Further, a coordinate indicating apparatus and a coordinate measurement apparatus which distinguishes whether a type of contact object is a stylus pen or a finger is provided.

FIG. 1 is a diagram illustrating a coordinate indicating system according to an embodiment of the present invention. As illustrated in FIG. 1, a coordinate measurement apparatus 1, according to an embodiment of the present invention, measures a coordinate of an input position by detecting an input by a coordinate indicating apparatus 2 or a part of a user's body such as a finger 3.

Although the coordinate measurement apparatus 1 is described as a smart phone or a tablet PC, the type of coordinate measurement apparatus 1 is not limited thereto. The coordinate measurement apparatus 1 can be any apparatus including a channel electrode unit, a transmitter, and a receiver for measuring a coordinate, described in more detail below.

The coordinate indicating apparatus 2 is implemented as a stylus pen, and can designate a particular coordinate of the coordinate measurement apparatus 1 by being in contact with the coordinate measurement apparatus 1. The coordinate indicating apparatus 2 has a relatively smaller contact area than that of the finger 3.

The coordinate measurement apparatus 1 determines whether a touch is made by the coordinate indicating apparatus 2 such as the stylus pen or the finger 3. That is, the coordinate measurement apparatus 1 distinguishes a type of contact object. Here, the contact object includes a conductive object such as the finger and the stylus pen which is distinguished from the conductive object.

The coordinate measurement apparatus 1 first measures an input position of the contact object 2 or 3. For example, the coordinate measurement apparatus 1 measures the position of the contact object 2 or 3 according to a capacitance change due to a contact of the contact object 2 or 3. The position measurement according to the capacitance change will be described below in more detail. Accordingly, the coordinate measurement apparatus 1 measures both the position of the user's finger 3 and the position of the coordinate indicating apparatus 2 such as the stylus pen.

The coordinate measurement apparatus 1 distinguishes a type of the contact object 2 or 3 after measuring the input position of the contact object 2 or 3. When the contact object 2 or 3 is the coordinate indicating apparatus 2, the coordinate measurement apparatus 1 can receive identification information of the coordinate indicating apparatus 2 from the coordinate indicating apparatus 2. More specifically, the coordinate measurement apparatus 1 transmits a predetermined driving signal (hereinafter, referred to as a "Tx signal") to the coordinate indicating apparatus 2, and determines the type of the contact object based on a frequency response characteristic of the coordinate indicating apparatus 2 according to the Tx signal.

That is, when the coordinate measurement apparatus 1 receives a particular frequency response signal for the Tx signal, it can be determined that the coordinate indicating apparatus 2 touches the coordinate measurement apparatus 1. Further, when the coordinate measurement apparatus 1 does not receive the particular frequency response signal, it can be determined that the finger 3 touches the coordinate measurement apparatus 1.

Accordingly, the coordinate measurement apparatus 1 can first measure the input position of the contact object 2 or 3, and then distinguish the type of the contact object 2 or 3.

Figure 2A:
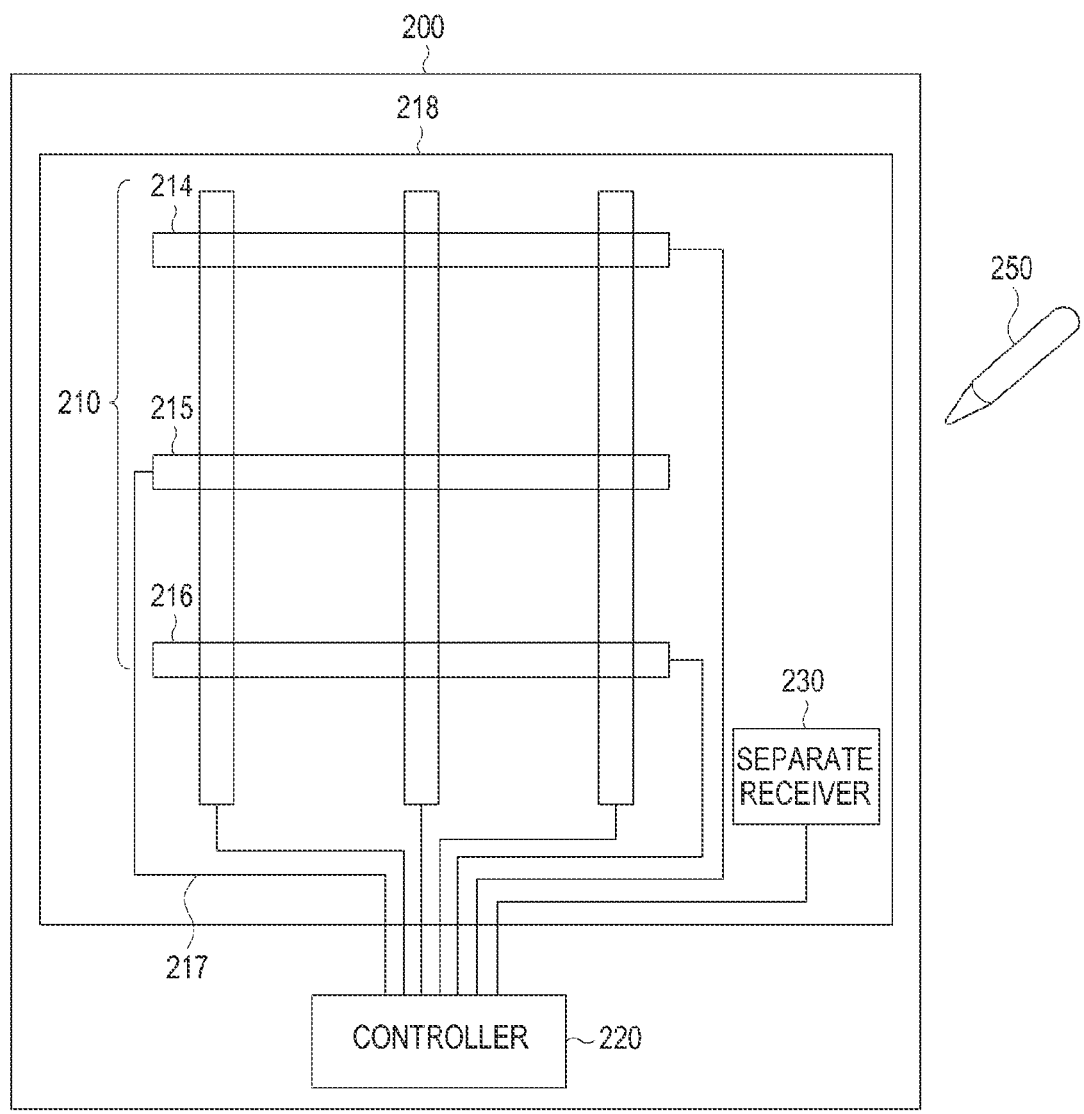
FIG. 2A is a diagram illustrating a coordinate measurement apparatus according to an embodiment of the present invention.

FIG. 2A is a diagram illustrating a coordinate measurement apparatus according to an embodiment of the present invention.

As illustrated in FIG. 2A, the coordinate measurement apparatus 200 includes a panel unit 218 and a controller 220. The panel unit 218 includes a channel electrode unit 210 including a plurality of electrodes 211 through 216 and a connection electrode line 217 for connecting the channel electrodes and the controller 220. Alternatively, the coordinate measurement apparatus 200 may further include an image display means such as a LCD or a CRT screen, a glass film or the like. Further, it is assumed that the coordinate measurement apparatus 200 measures an input position of the coordinate indicating apparatus 250 such as the stylus pen.

The channel electrode unit 210 includes at least one of reception electrodes 211 through 213 and at least one of transmission electrodes 214 through 216. Here, the transmission electrodes 214 through 216 transmit a predetermined transmission signal (hereinafter, referred to as a "Tx signal") based on an electrical signal input from the controller 220 to an outside.

The controller 220 inputs the electrical signal into the transmission electrodes 214 through 216 according to a preset order. For example, the controller 220 inputs the electrical signal into the transmission electrode 214 for a preset period and stops inputting the electrical signal after the preset period. After the input of the electrical signal into the transmission electrode 214 stops, the controller 220 inputs the electrical signal into the transmission electrode 215 for the same period as the preset period.

Further, the controller 220 stops inputting the electrical signal into the transmission electrode 215 after the preset period and similarly inputs the electrical signal into the transmission electrode 216. That is, the controller 220 inputs the electrical signal preset according to the order of the transmission electrode 214, the transmission electrode 215, and the transmission electrode 216. The number of transmission electrodes 214 through 216 can be a different number. Further, although it has been illustrated in FIG. 2A that the transmission electrodes 214 through 216 are spaced apart from each other by a predetermined distance, alternatively, the transmission electrodes 214 through 216 may overlap with each other for a more precise determination of the input position. Additionally, the design a layout pattern of the transmission electrodes 214 through 216, is not limited by the layout pattern in FIG. 2A and can be changed in other ways. The transmission electrodes 214 through 216 may be implemented by, for example, Indium Tin Oxide (ITO).

The Tx signal output from the transmission electrodes 214 through 216 is received by the reception electrodes 211 through 213. Electrodes of the transmission electrodes 214 through 216 sequentially output the electrical signal based on a preset order. For example, the controller 220 inputs the electrical signal into the transmission electrode 214 for a first period and input the electrical signal into the transmission electrode 215 for a second period after the first period ends. The controller 220 inputs the electrical signal into the transmission electrode 216 for a third period after the second period ends. Here, temporal lengths of the first, second, and third periods may be the same. Accordingly, the Tx signal is output from the transmission electrode 214 for the first period, the Tx signal is output from the transmission electrode 215 for the second period, and the Tx signal is output from the transmission electrode 216 for the third period.

The controller 220 sequentially receives an Rx signal by the reception electrodes 211 through 213 based on a preset order or receives the Rx signal at the same time. Here, the Rx signal includes a response characteristic for the normal Tx signal of the coordinate indicating apparatus 250 as well as the signal input from one of the transmission electrodes 214 through 216. Here it is assumed that the first period includes a 1-1 sub period, a 1-2 sub period, and a 1-3 sub period. Further, it is assumed that the second period includes a 2-1 sub period, a 2-2 sub period, and a 2-3 sub period. In addition, it is assumed that the third period includes a 3-1 sub period, a 3-2 sub period, and a 3-3 sub period. For example, the controller 220 can receive the Rx signal through the reception electrode 211 for the 1-1 sub period. The controller 220 can receive the Rx signal through the reception electrode 212 for the 1-2 sub period after the 1-1 sub period ends. The controller 220 can receive the Rx signal through the reception electrode 213 for the 1-3 sub period after the 1-2 sub period ends. The controller receiving the Rx signal from the reception electrode may be named a detector.

That is, the Tx signal is output from the transmission electrode 214 for the first period, and the controller 220 can sequentially receive the Rx signal through the reception electrodes 211 through 213. Conversely, the controller 220 can receive the Rx signal through the reception electrodes 211 through 213 at the same time.

When the coordinate indicating apparatus 250 touches a particular coordinate on the channel electrode unit 210, capacitance of the corresponding electrode or capacitance between the corresponding electrode and neighboring electrodes may be changed. An intensity of the Rx signal may be changed based on the change in the capacitance, and an x-axis coordinate of the input position of the coordinate indicating apparatus 250 may be determined based on the change in the intensity of the Rx signal. For example, Table 1 shows Rx signal intensity change data in each reception electrode for the first period according to an embodiment of the present invention.

TABLE 1

| | Period | | |
|---|---|---|---|
| | 1-1 sub period 211 | 1-2 sub period 212 | 1-3 sub period 213 |
| Amount of changes in Rx signal intensity | 2 | 8 | 3 |

The process described above may be repeated in the same way during the second and third periods. That is, the transmission electrode 215 transmits the Tx signal for the second period, and the Rx signal is received by the reception electrode 211, the reception electrode 212, and the reception electrode 213 for the 2-1 sub period, the 2-2 sub period, and the 2-3 sub period, respectively. The transmission electrode 216 transmits the Tx signal for the third period, and the Rx signal is received by the reception electrode 211, the reception electrode 212, and the reception electrode 213 for the 3-1 sub period, the 3-2 sub period, and the 3-3 sub period, respectively.

Tables 2 and 3 below show Rx signal intensity change data in the reception electrodes for the second and third periods, respectively.

TABLE 2

|  | Period | | |
| --- | --- | --- | --- |
|  | 2-1 sub period 211 | 2-2 sub period 212 | 2-3 sub period 213 |
| Amount of changes in Rx signal intensity | 5 | 15 | 6 |

TABLE 3

|  | Period | | |
| --- | --- | --- | --- |
|  | 3-1 sub period 211 | 3-2 sub period 212 | 3-3 sub period 213 |
| Amount of changes in Rx signal intensity | 2 | 4 | 1 |

The controller 220 determines the input position of the coordinate indicating apparatus 250 by summing the data shown in Tables 1 through 3. As shown in the data of Tables 1 through 3, the intensity of the Rx signal received by the reception electrode 212 is identified as most significantly changed. Further, as shown in the data of Tables 1 through 3, it may be identified that an amount of changes in the Rx signal intensity for the second period is higher in comparison with those for the first and third periods. Accordingly, the controller 220 determines that an x-axis coordinate corresponding to the reception electrode 212 is the x-axis coordinate of the input position of the coordinate indicating apparatus 250. In addition, the controller 220 determines a y-axis coordinate corresponding to the transmission electrode 215 corresponding to the second period as a y-axis coordinate of the input position of the coordinate indicating apparatus 250. That is, the controller 220 determines an intersecting point between the transmission electrode 215 and the reception electrode 212 as the input position. Alternatively, the controller 220 can determine the coordinate of the input position by interpolation or various algorithms based on the data of Tables 1 through 3.

Accordingly, the controller 220 can first determine the input position of the coordinate indicating apparatus 250. Thereafter, the controller 220 determines whether the object used for the touch is the coordinate indicating apparatus 250 or the finger. The coordinate indicating apparatus 250 can have a specific response characteristic which can be identification information of the coordinate indicating apparatus for the Tx signal generated in the transmission electrodes 214 through 216. In this case, the controller 220 can receive the identification information of the coordinate indicating apparatus from the Rx signals received by the reception electrodes 211 through 213. Accordingly, the controller 220 can detect whether there is the identification information of the coordinate indicating apparatus in the Rx signals, and thus determine whether the touch is made by the coordinate indicating apparatus 250.

When the user performs a touch with his/her finger or when the user performs a touch with the coordinate indicating apparatus, the controller 220 determines whether there is a specific response characteristic generated by the coordinate indicating apparatus in the Rx signals, so that it can be determined whether the touch is performed by the finger or the coordinate indicating apparatus.

That is, the controller 220 distinguishes the type of the contact object according to whether the identification information of the coordinate indicating apparatus is included in the Rx signal.

Alternatively, the controller 220 can apply signals having two or more different frequencies to the transmission electrodes 214 through 216. The controller 220 determines the position of the contact object from a response characteristic of one frequency, and determines the type or a contact pressure of the contact object from a response characteristic for another frequency.

Figure 2B:
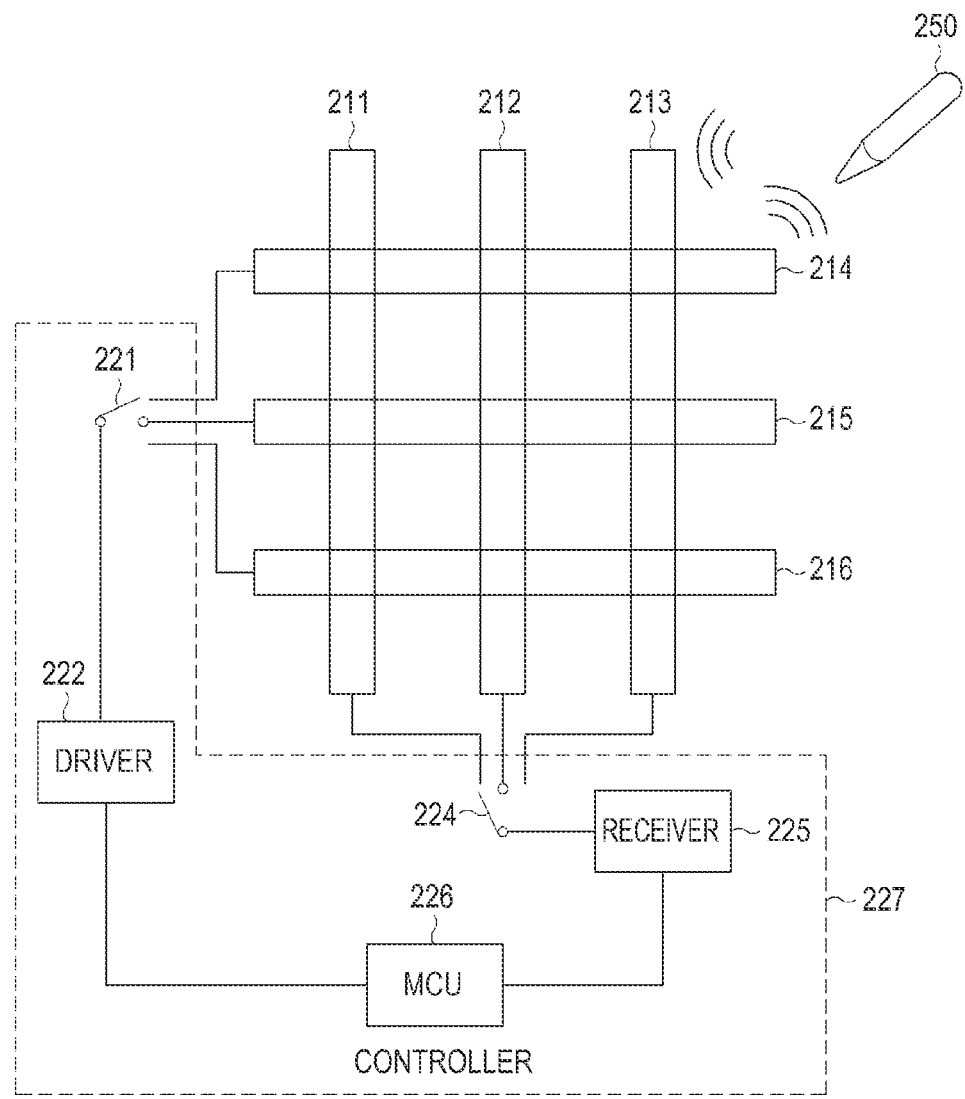
FIG. 2B is a diagram illustrating a coordinate measurement system according to an embodiment of the present invention.

FIG. 2B is a diagram illustrating a coordinate measurement system according to an embodiment of the present invention. As illustrated in FIG. 2B, the coordinate measurement system includes the reception electrodes 211 through 213, the transmission electrodes 214 through 216, and a controller 227, and the controller 227 includes a transmission electrode control switch 221, a driver 222, a reception electrode control switch 224, a receiver 225, an MCU 226 and the like.

The driver 222 provides a preset electrical signal to the transmission electrodes 214 through 216 through the transmission electrode control switch 221.

The transmission electrode control switch 221 provides the electrical signal from the driver 222 to each of the transmission electrodes 214 through 216 based on a preset order. As described with reference to FIG. 2A, the transmission electrode control switch 221 can connect, for example, the transmission electrode 214 to the driver 222 for the first period, the transmission electrode 215 to the driver 222 for the second period, and the transmission electrode 216 to the driver 222 for the third period. The transmission electrodes 214 through 216 can output the Tx signal based on the received electrical signal.

The reception electrode control switch 224 connects the reception electrodes 211 through 213 to the receiver 225 based on a preset order. For example, the reception electrode control switch 224 connects the reception electrode 211 to the receiver 225 for the 1-1 sub period, the reception electrode 212 to the receiver 225 for the 1-2 sub period, and the reception electrode 213 to the receiver 225 for the 1-3 sub period.

Additionally, a plurality of receivers can receive the Rx signal by the plurality of reception electrodes 211 through 213 at the same time without the reception electrode control switch.

The MCU 226 determines the input position and the type of the contact object by analyzing the received Rx signal.

Figure 3A:
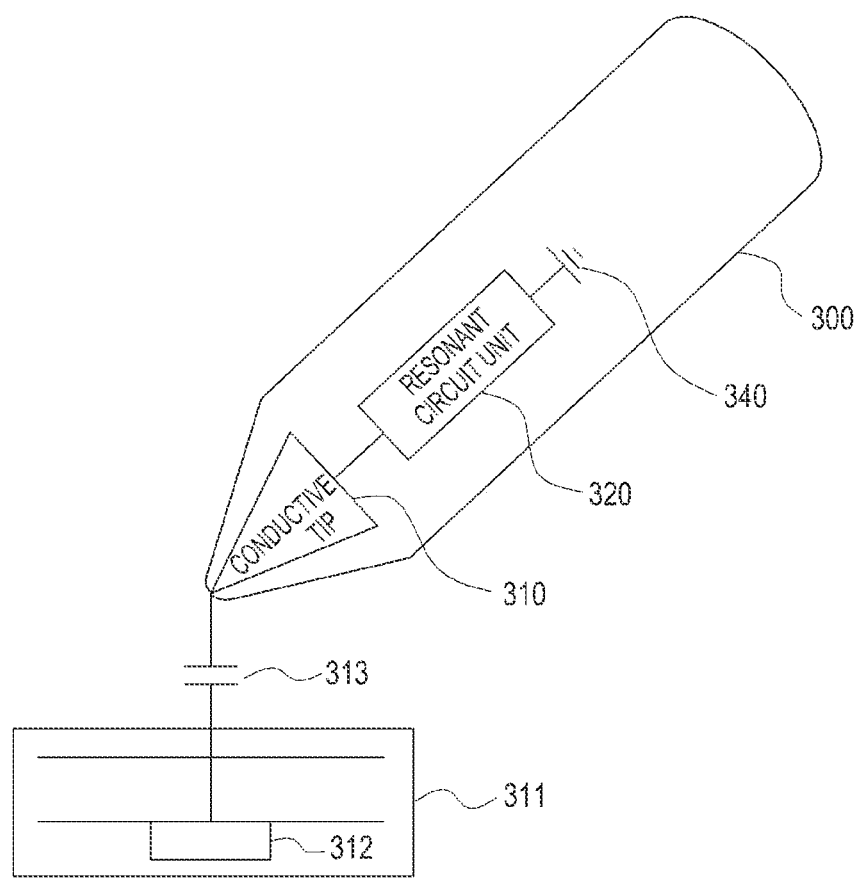
FIGS. 3A to 3E are diagrams illustrating a coordinate indicating apparatus according to an embodiment of the present invention.

FIG. 3A is a diagram illustrating a coordinate indicating apparatus according to an embodiment of the present invention.

As illustrated in FIG. 3A, a coordinate indicating apparatus 300 includes a conductive tip 310, a resonant circuit unit 320, and a grounding unit 340. One end of the conductive tip 310 is connected to one end of the resonant circuit unit 320. Further, the other end of the resonant circuit unit 320 may be connected to the grounding unit 340. For example, the coordinate indicating apparatus 300 may be implemented in a pen shape.

The conductive tip 310 forms capacitance 313 with channel electrodes 312 included in the coordinate measurement apparatus (not shown). The conductive tip 310 may be constructed as, for example, a metal tip, and forms the capacitance 313 with at least one of the channel electrodes 312 of the coordinate measurement apparatus (not shown). The conductive tip 310 may exist within a nonconductive material, or a part of the conductive tip 310 may be exposed to an outside. Further, the channel electrode 312 may be constructed as a transparent electrode in a lower end of a transparent window 311 in order to be applied to the touch screen.

The resonant circuit unit 320 can resonate with the Tx signal received from the coordinate measurement apparatus (not shown). The resonant circuit unit 320 can output a resonance signal due to a resonance even after the Tx signal input stops. For example, the resonant circuit unit 320 can output a sine waveform signal having a resonance frequency of the resonant circuit unit. Here the sine waveform signal having a particular resonance frequency may be the identification information of the coordinate indicating apparatus.

That is, when the sine waveform signal having the particular resonance frequency is included in the Rx signal, the coordinate measurement apparatus determines that the type of contact object corresponds to the coordinate indicating apparatus.

Alternatively, the resonance frequency of the resonant circuit unit 320 may be changed according to a contact pressure of the conductive tip 310. For example, when the user is in contact with the coordinate indicating apparatus, the resonance frequency of the resonance circuit unit 320 may be changed.

Accordingly, the coordinate measurement apparatus determines a writing pressure based on the change in the resonance frequency.

Further, the resonant circuit unit 320 may further include a resistor connected in parallel. Here, the resistor may be a variable resistor, and a resonance characteristic may be changed according to a change in a resistance value. In addition, the coordinate indicating apparatus may further include a switch unit mechanically controlled by the user. In the coordinate measurement apparatus, the resonance characteristic may be changed according to a state of the switch unit. Accordingly, for example, the user inputs a write/erase function based on an on/off state of the switch unit.

Figure 3B:
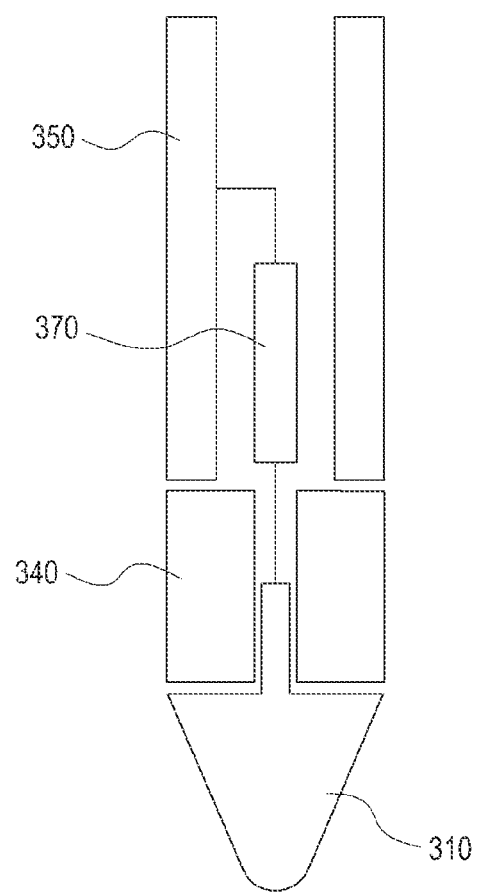

FIG. 3B is a cross-sectional diagram illustrating the coordinate indicating apparatus according to an embodiment of the present invention.

As illustrated in FIG. 3B, the coordinate indicating apparatus includes the conductive tip 310, the grounding unit 350, an insulator 340, and a passive circuit unit 370.

The conductive tip 310 forms capacitance with electrodes included in the coordinate measurement apparatus (not shown). A part of the conductive tip 310 may be exposed to an outside of the coordinate indicating apparatus as illustrated in FIG. 3B.

Additionally, in order to make the user feel a softer tactile feeling when using the coordinate indicating apparatus, the coordinate indicating apparatus may further include the insulator for preventing the conductive tip 310 from directly being in contact with the outside.

The passive circuit unit 370 is electrically connected to the conductive tip 310. The passive circuit unit 370 can generate the identification information of the coordinate indicating apparatus. That is, the passive circuit unit 370 can make a physical characteristic of the coordinate indicating apparatus different from that of the finger. In FIG. 3A, the resonant circuit unit has been described as an example of the passive circuit unit 370.

The insulator 340 electrically insulates the conductive tip 310 from the grounding unit 350.

The shape of the insulator 340 can vary, as long as the insulator 340 serves to insulate the conductive tip 310 from the grounding unit 350.

The grounding unit 350 is connected to the passive circuit unit 370, and can be electrically connected to the user or the coordinate indicating apparatus through at least one of a direct contact and a capacitive coupling.

Figure 3C:
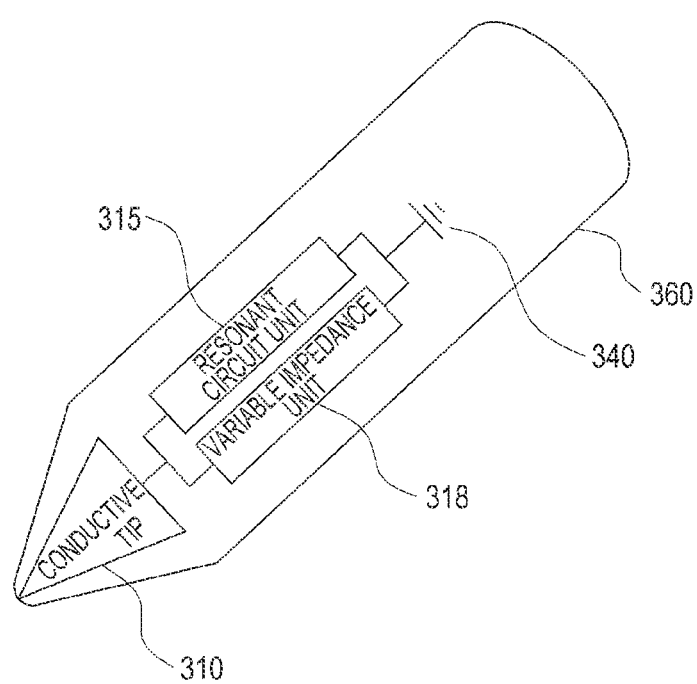

FIG. 3C is a diagram illustrating a coordinate indicating apparatus according to another embodiment of the present invention. As illustrated in FIG. 3C, a coordinate indicating apparatus 360 includes the conductive tip 310, a resonant circuit unit 315, a variable impedance unit 318, and the grounding unit 340.

The conductive tip 310 forms capacitance with electrodes included in the coordinate measurement apparatus (not shown). The resonant circuit unit 315 may be electrically connected to the conductive tip 310. The resonant circuit unit 315 can generate the identification information of the coordinate indicating apparatus and output the generated identification information. That is, the resonant circuit unit 315 can make a physical characteristic of the coordinate indicating apparatus different from that of the finger. Further, the variable impedance unit 318 may be implemented by a set of devices of which impedance may be changed by at least one of the contact pressure and the contact or noncontact. As the variable impedance unit 318 provides impedance changed according to at least one the contact pressure and an on/off state of the user selection switch, the resonance characteristic can be changed according to the contact pressure and the on/off state of the user selection switch. The coordinate measurement apparatus determines at least one state of the contact pressure of the coordinate indicating apparatus and the on/off state of the user selection switch based on the changed resonance characteristic. At this time, a configuration of the variable impedance unit 318 includes reactance or resistance components changed according to the contact pressure or the on/off state of the user selection switch. The resonant circuit unit 315 may have a high-impedance characteristic in a particular resonance frequency.

Figure 3D:
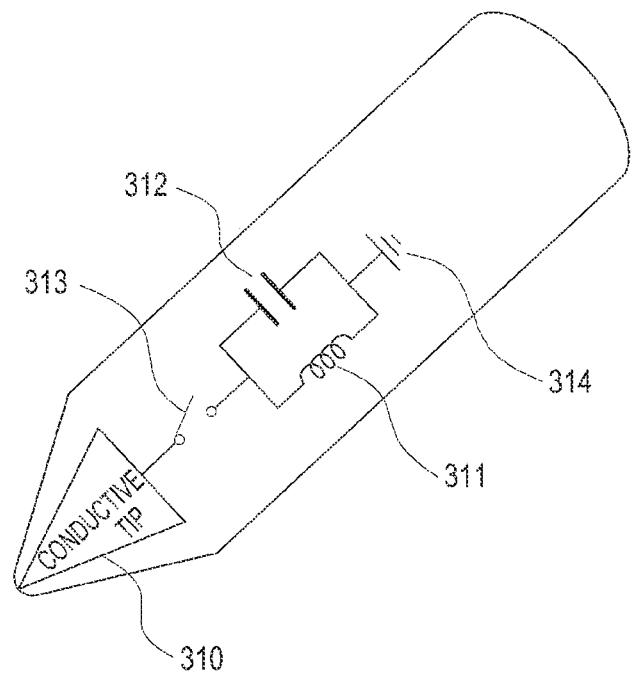

FIG. 3D is a diagram illustrating the coordinate indicating apparatus according to an embodiment of the present invention.

As illustrated in FIG. 3D, the coordinate indicating apparatus includes the conductive tip 310, a coil unit 311, a capacitor unit 312, a switch unit 313, and a grounding unit 314.

The conductive tip 310 forms capacitance with electrodes included in the coordinate measurement apparatus (not shown). The coil unit 311 and the capacitor unit 312 form a parallel resonant circuit. As the coil unit 311 and the capacitor unit 312 form the resonant circuit, the coordinate indicating apparatus outputs a resonance signal.

The switch unit 313 may be connected to one end of the coil unit 311 and one end of the capacitor unit 312. The switch unit 313 may be controlled mechanically. The resonance characteristic may be changed based on an on/off state of the switch unit 313. For example, a connection between the conductive tip 310 and the resonant circuit is disconnected when the switch unit 313 is in the off state, and the conductive tip 310 may be connected to the resonant circuit when the switch unit 313 is in the on state. As an embodiment of such a configuration, the switch unit 313 forms the resonant circuit when the conductive tip 310 is touched with a pressure equal to or higher than a preset threshold, and the switch unit 313 may not form the resonant circuit by disconnecting an electrical connection when the conductive tip 310 is touched with a pressure lower than the preset threshold. Only when the coordinate indicating apparatus performs the touch with the pressure equal to or higher than the preset threshold, the touch can be recognized as an input, and accordingly, it is possible to effectively reduce the input of the coordinate indicating apparatus generated by an error.

Figure 3E:
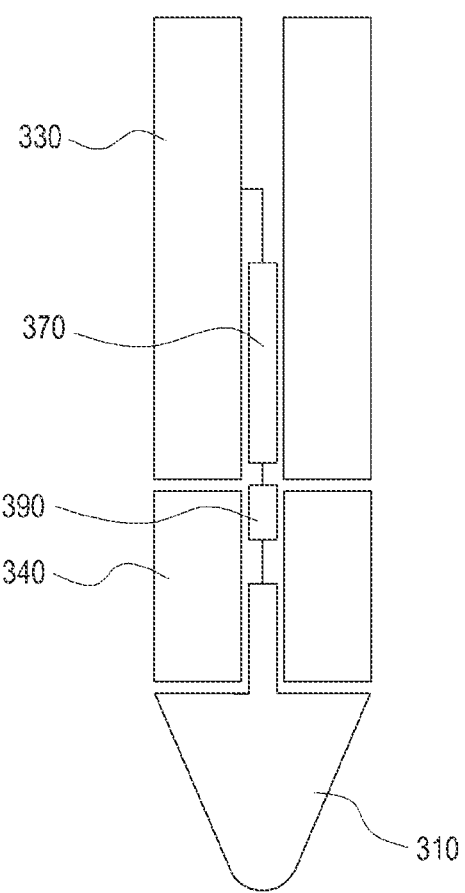

FIG. 3E is a cross-sectional diagram illustrating the coordinate indicating apparatus according to an embodiment of the present invention.

As illustrated in FIG. 3E, the coordinate indicating apparatus includes the conductive tip 310, the grounding unit 330, the insulator 380, the passive circuit unit 370, and a switch unit 390.

The coordinate indicating apparatus of FIG. 3E may further include the switch unit 390 in comparison with the coordinate indicating apparatus of FIG. 3B. The switch unit 390 may be electrically connected between the conductive tip 310 and the passive circuit unit 370. As described in connection with FIG. 3D, the switch unit 390 may operate the resonant circuit only when the conductive tip 310 is touched with the pressure equal to or higher than the preset threshold.

Figure 4A:
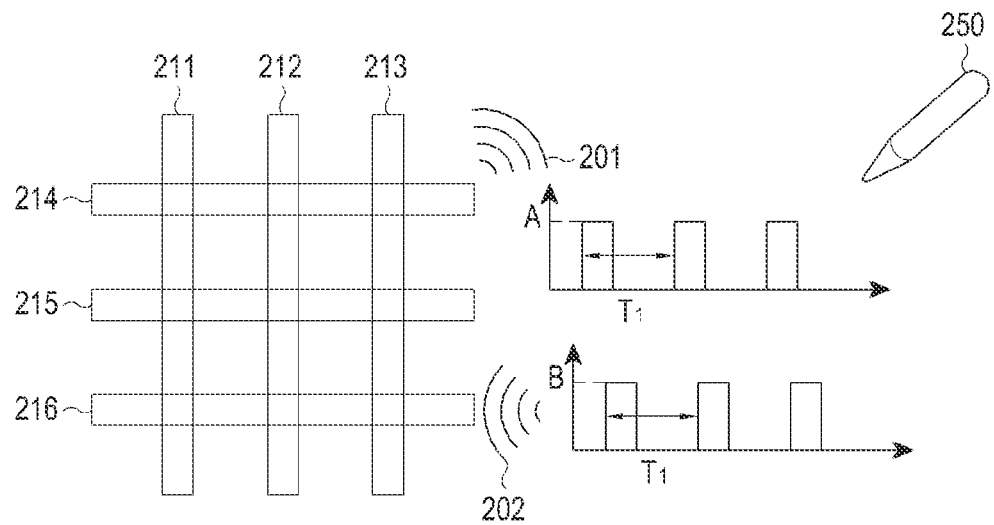
FIGS. 4A to 4C are diagrams illustrating a coordinate indicating apparatus identifying process according to an embodiment of the present invention.
Figure 4B:
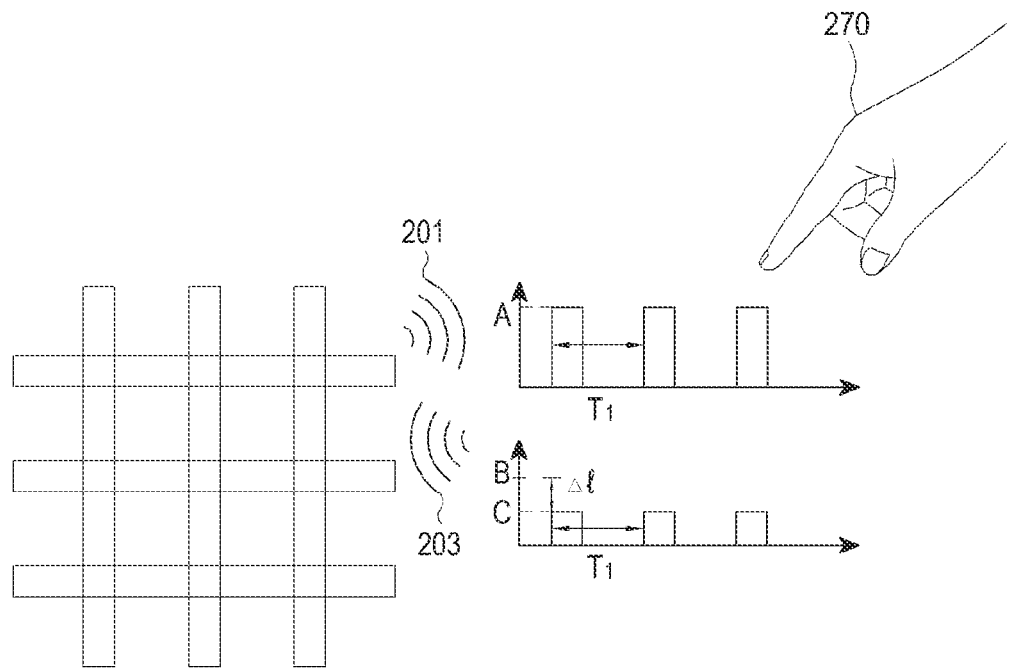
Figure 4C:
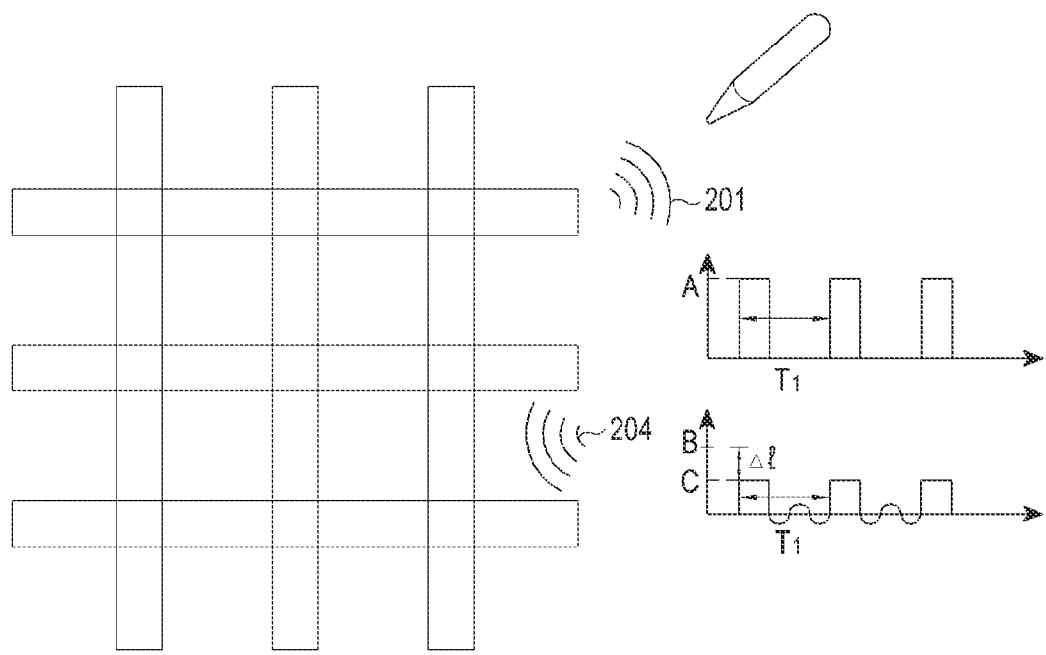

FIGS. 4A to 4C are diagrams illustrating a coordinate indicating apparatus identifying process according to an embodiment of the present invention.

As illustrated in FIG. 4A, the transmission electrodes 214 through 216 output the Tx signal 201. As illustrated in FIG. 4A, the Tx signal may be a square wave signal and have a predetermined period T1 and amplitude A. In FIG. 4A, it is assumed that the coordinate indicating apparatus or the finger is not located near the coordinate measurement apparatus. The Rx signal 202 may have the same period T1 as that of the Tx signal 201.

In FIG. 4B, it is assumed that the user touches a particular point of the electrode by using his/her finger. As illustrated in FIG. 4B, the Tx signal 201 may be the square wave signal and have the predetermined period T1 and amplitude A. When the finger is touched (C) in a different manner from that of when the finger is touched (B) before, a size of amplitude of the Rx signal 203 may be changed. That is, the amplitude of the Rx signal 203 may be changed by Δ1 from amplitude (B) of the Rx signal 202 in FIG. 4A.

In FIG. 4C, it is assumed that the user touches a particular point by using the coordinate indicating apparatus. As illustrated in FIG. 4B, the Tx signal 201 may be the square wave signal and have the predetermined period T1 and amplitude A. A change in amplitude (C) may be identified for the Rx signal 204 by a capacitance change of the channel electrode unit of the coordinate indicating apparatus. That is, the amplitude may be changed by Δ1 from the amplitude B of the Rx signal 202 in FIG. 4A. The Rx signal 204 may be identified to include a sine waveform signal in a rest period of the square wave. That is, the Rx signal 204 includes the identification information of the coordinate indicating apparatus. The coordinate measurement apparatus determines that the contact object is the coordinate indicating apparatus based on the existence of the identification information of the coordinate indicating apparatus in the rest period of the square wave of the Rx signal 204. That is, the coordinate measurement apparatus determines the position of the contact object by the Rx signal during a driving period in which the driver (not shown) applies a driving signal, and determine the type of the contact object by the Rx signal during the rest period in which the driver (not shown) does not apply the driving signal.

The square wave and the sine waveform in FIGS. 4A to 4C are merely examples.

As described above, for example, a period for identification information of the coordinate indicating apparatus included in the Rx signal 204 from the coordinate indicating apparatus may be changed since the resonance characteristic is changed according to the writing pressure or the state of the switch unit. The coordinate indicating apparatus detects the change in the period of the sine waveform, and thus determines the writing pressure of the coordinate indicating apparatus or the state of the switch unit.

Figure 5:
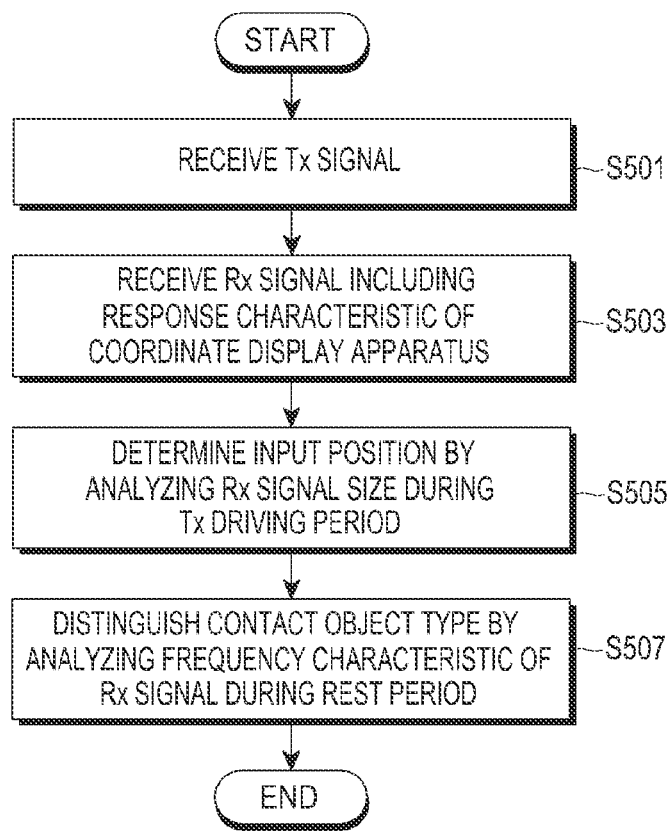
FIG. 5 is a flowchart illustrating a control method of a coordinate measurement system according to another embodiment of the present invention.

FIG. 5 is a flowchart of a control method of a coordinate measurement system according to another aspect of the present invention.

Each of the transmission electrodes of the coordinate measurement apparatus transmits the Tx signal based on a preset order in Step S501. The coordinate measurement apparatus can receive the Rx signal including a response characteristic of the coordinate indicating apparatus in Step S503. The coordinate measurement apparatus determines an input position of a contact object by analyzing a change in a size of the Rx signal during a Tx driving period in Step S505, and then distinguish a type of the contact object by analyzing a response characteristic of a frequency of the Rx signal during a Tx rest period in Step S507.

Figure 6:
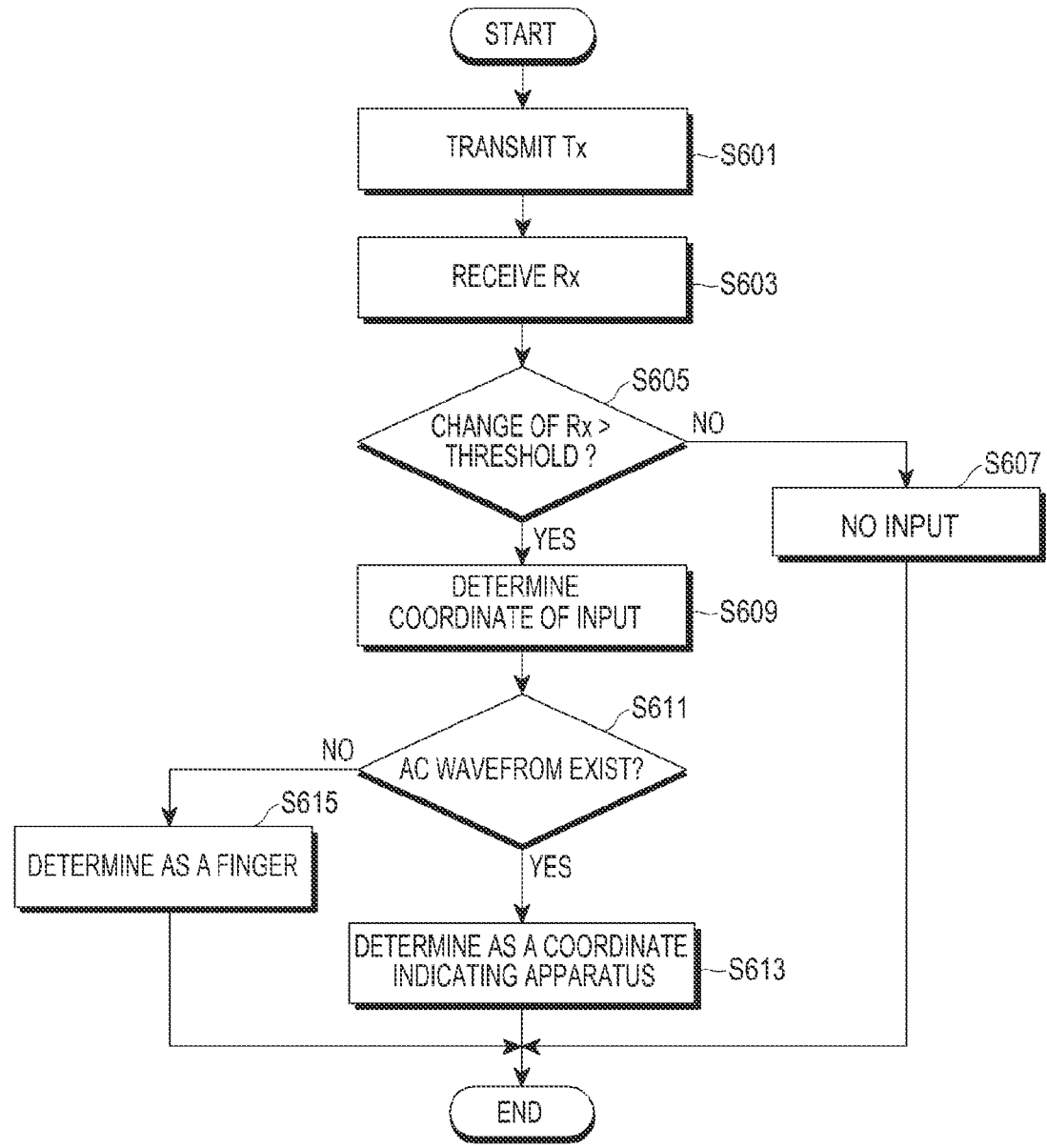
FIG. 6 is a flowchart illustrating a control method of a coordinate measurement system according to yet another embodiment of the present invention.

FIG. 6 is a flowchart of a control method of a coordinate measurement system according to another embodiment of the present invention.

Each of the transmission electrodes of the coordinate measurement apparatus transmits the Tx signal based on a preset order in Step S601. The coordinate measurement apparatus can receive the Rx signal including a response characteristic of the coordinate indicating apparatus in Step S603.

When the change in the Rx signal size is equal to or smaller than a preset threshold, for example, Δ1 illustrated in FIG. 4B ("no" in Step S605), the coordinate measurement apparatus determines that there is no input in Step S607.

When the change in the Rx signal size is larger than the preset threshold, for example, Δ1 illustrated in FIG. 4B ("yes" in Step S605), the coordinate measurement apparatus determines coordinate of input in Step S609.

The coordinate measurement apparatus determines whether there is an AC waveform within the Rx signal during the Tx rest period in Step S611. When there is the AC waveform within the Rx signal ("yes" in Step S611), the coordinate measurement apparatus determines that the contact object is the coordinate indicating apparatus in Step S613. When there is no AC waveform within the Rx signal ("no" in Step S611), the coordinate measurement apparatus determines that the contact object is the finger in Step S615.

Figure 7:
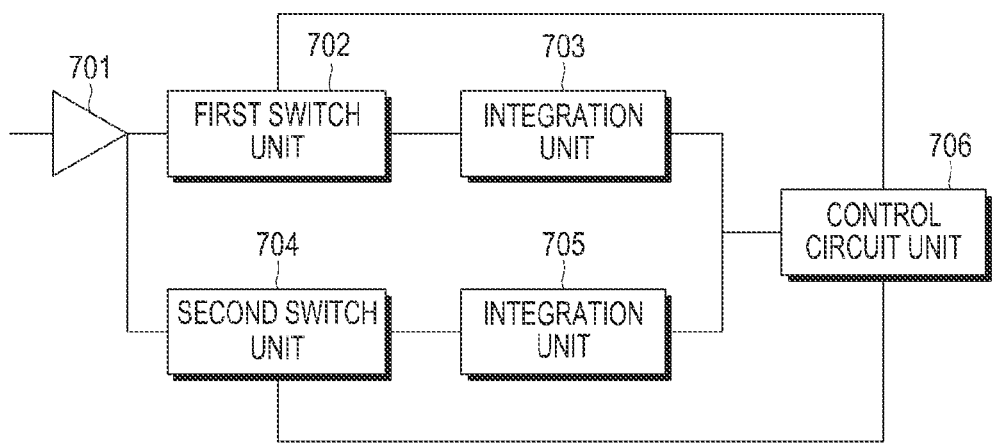
FIG. 7 is a block diagram illustrating a method of measuring a resonance frequency change by a writing pressure according to an embodiment of the present invention.

FIG. 7 is a block diagram for describing a method of measuring a resonance frequency change by the writing pressure or the switch on/off state according to an embodiment of the present invention.

The Rx signal may be amplified by an amplifier 701 by a preset gain. A first switch unit 702 can output the amplified Rx signal to an integration unit 703 for a first period. A second switch unit 704 can output the amplified Rx signal to an integration unit 705 for a second period.

The first period and the second period have a temporally overlapping section, but their entire sections are not the same as each other. The first switch unit 702 and the second switch unit 704 can make an on/off control at a predetermined time based on a driving pulse generation and end in a control circuit unit 706. Further, a rectifier may be further introduced to improve reception signal sensitivity.

The control circuit unit 706 measures frequency response characteristics in different sections of the first period and the second period. Since a ratio of the signal measured in each section may be different according to a frequency response characteristic of a coordinate indicating object, the control circuit unit 706 determines the contact pressure of the coordinate indicating apparatus or the on/off state of the switch unit of the coordinate indicating apparatus according to the ratio of the signal measured in each section.

That is, the control circuit unit 706 measures the contact pressure or the switch on/off state based on response characteristics of a passive circuit in at least two different sections of the same period.

While the present invention has been shown and described with reference to various embodiments thereof, it will be understood by those skilled in the art that various changes in form and details may be made without departing from the spirit and scope of the present invention as defined by the appended claims.

What is claimed is:

1. A coordinate measurement system comprising:
a coordinate indicating apparatus; and
a coordinate measurement apparatus configured to determine a position of a contact object including the coordinate indicating apparatus,
wherein the coordinate measurement apparatus comprises:
a channel electrode unit including at least one transmission electrode and at least one reception electrode, wherein the at least one transmission electrode transmits an electrical transmission signal; and
a controller configured to measure a signal outputted from each of the at least one reception electrode,
wherein the coordinate indicating apparatus comprises:
a conductive tip configured to form a capacitance with one or more electrodes of the channel electrode unit; and
a resonant circuit unit configured to:
produce resonance by using the electrical transmission signal, and
generate a reception signal corresponding to the electrical transmission signal received from the coordinate measurement apparatus, wherein the resonant circuit unit is connected to the conductive tip,
wherein the controller is further configured to:
determine an input position of the contact object based on the signal outputted from each of the at least one reception electrode, and
identify a type of the contact object based on whether the reception signal is detected through the at least one reception electrode, and
wherein the reception signal is generated from the resonance.

2. The coordinate measurement system of claim 1, wherein the coordinate indicating apparatus further comprises a grounding unit, electrically connected to at least one of a user and the coordinate measurement apparatus through at least one of a direct contact and a capacitance formed between the grounding unit and the at least one of the user and the coordinate measurement apparatus.

3. The coordinate measurement system of claim 2, wherein the resonant circuit unit further comprises:
an inductor; and
a capacitor,
wherein one end of each inductor and capacitor is connected to the conductive tip and another end of each inductor and capacitor is connected to the grounding unit.

4. The coordinate measurement system of claim 3, wherein the resonant circuit unit further comprises a resistor, and
wherein one end of the resistor is connected to the conductive tip and another end of the resistor is connected to the grounding unit.

5. The coordinate measurement system of claim 2, wherein the resonant circuit unit comprises an inductor, and
wherein one end of the inductor is connected to the conductive tip and another end of the inductor is connected to the grounding unit.

6. The coordinate measurement system of claim 1, further comprising an insulator for preventing the conductive tip from direct contact with an outside.

7. The coordinate measurement system of claim 1, wherein the reception signal is changed according to a contact pressure.

8. The coordinate measurement system of claim 1, wherein the coordinate indicating apparatus further comprises a switch unit for changing the reception signal.

9. A coordinate measurement system comprising:
a coordinate indicating apparatus; and
a coordinate measurement apparatus configured to determine a position of a contact object including the coordinate indicating apparatus,
wherein the coordinate measurement apparatus comprises:
a channel electrode unit including at least one transmission electrode and at least one reception electrode;
a driver configured to apply an electrical driving signal to the at least one transmission electrode;
a detector configured to detect a signal outputted from the at least one reception electrode; and
a controller configured to determine the position of the contact object and a type of the contact object,
wherein the coordinate indicating apparatus comprises a resonant circuit configured to produce resonance by using a signal from the channel electrode unit and output a reception signal which is generated from the resonance, and
wherein the controller is further configured to:
determine the position of the contact object based on the signal outputted from each of the at least one reception electrode for a first period in which the driver applies the electrical driving signal, and
identify the type of the contact object based on whether the reception signal is detected by the detector for a second period in which the driver does not apply the electrical driving signal.

10. The coordinate measurement system of claim 9,
wherein the reception signal is changed according to a contact pressure of the coordinate indicating apparatus, and wherein the controller is further configured to determine the contact pressure of the contact object based on the change of the reception signal.

11. The coordinate measurement system of claim 9, wherein the coordinate indicating apparatus further comprises a switch unit for changing the reception signal, and
wherein the controller is further configured to determine an on/off state of the switch unit based on a changing of the reception signal.

12. A coordinate measurement system comprising:
a coordinate indicating apparatus; and
a coordinate measurement apparatus configured to determine a position of a contact object corresponding to at least one of the coordinate indicating apparatus and a conductive object,
wherein the coordinate measurement apparatus comprises:
  a channel electrode unit including at least one transmission electrode and at least one reception electrode; and
  a controller configured to:
    apply electrical signals having two or more different frequencies to the at least one transmission electrode, and
    measure a signal outputted from each of the at least one reception electrode,
wherein, the at least one transmission electrode transmits an electrical transmission signal corresponding to the electrical signals,
wherein the coordinate indicating apparatus comprises:
  a conductive tip configured to:
    form a capacitance with the at least one transmission electrode and the at least one reception electrode of the channel electrode unit, and
    receive the electrical transmission signal; and
  a passive resonant circuit unit configured to:
    receive for the electrical transmission signal from the conductive tip,
    produce resonance by using the electrical transmission signal, and
    transmit a reception signal corresponding to the electrical transmission signal,
wherein the reception signal is generated from the resonance, and
wherein the controller is further configured to:
  determine the position of the contact object based on the signal, which has a first frequency of the two or more different frequencies, outputted from each of the at least one reception electrode,
  identify a type of the contact object based on whether the reception signal is detected through the at least one reception electrode, and
  determine a contact pressure of the coordinate indicating apparatus based on the reception signal having a second frequency of the two or more different frequencies.

13. A coordinate measurement system comprising:
a coordinate indicating apparatus; and
a coordinate measurement apparatus configured to determine a position of the coordinate indicating apparatus,
wherein the coordinate measurement apparatus comprises:
  a channel electrode unit including at least one transmission electrode and at least one reception electrode;
  a receiver configured to receive a reception signal from the at least one reception electrode; and
  a controller configured to determine a contact pressure of the coordinate indicating apparatus,
wherein the coordinate indicating apparatus comprises:
  a conductive tip configured to exchange an electrical transmission signal and the reception signal with the channel electrode unit, wherein the conductive tip forms a capacitance with the channel electrode unit; and
  a passive resonant circuit unit configured to:
    receive the electrical transmission signal through the capacitance between the channel electrode unit and the conductive tip,
    produce resonance by using the electrical transmission signal, and
    generate the reception signal corresponding to the electrical transmission signal, wherein the reception signal is changed according to the contact pressure of the coordinate indicating apparatus and the reception signal is generated from the resonance, and
wherein the controller is further configured to:
  measure the contact pressure of the coordinate indicating apparatus based on the reception signal in two or more different sections of a same period.

14. The coordinate measurement system of claim 13, wherein the controller is further configured to measure the contact pressure based on an integration result of a detection value of the receiver for the reception signal in the two or more different sections of the same period.

15. A coordinate measurement system comprising:
a coordinate indicating apparatus; and
a coordinate measurement apparatus configured to determine a position of a contact object including the coordinate indicating apparatus,
wherein the coordinate measurement apparatus comprises:
  a channel electrode unit including at least one transmission electrode and at least one reception electrode, wherein the at least one transmission electrode transmits an electrical transmission signal; and
  a controller configured to measure a reception signal received through the at least one reception electrode,
wherein the coordinate indicating apparatus comprises:
  a conductive tip configured to form a capacitance with one or more electrodes of the channel electrode unit;
  a grounding unit configured to form an electrical connection with a user through at least one of a direct contact and the capacitance;
  a resonant circuit unit connected to the conductive tip; and
  a switch unit configured to:
    form a resonance when a contact pressure of the conductive tip is equal to or higher than a preset threshold, and
    prevent forming of the resonance when the contact pressure of the conductive tip is lower than the preset threshold,
wherein the resonant circuit unit produces the resonance by using the electrical transmission signal,
wherein the resonant circuit unit transmits the reception signal corresponding to the electrical transmission signal, and
wherein the reception signal is generated from the resonance.

16. The coordinate measurement system of claim 15,
wherein the switch unit prevents a forming of a resonant circuit by disconnecting one or more electrical connections of the conductive tip, the resonant circuit unit, a circuit connected to the grounding unit, and a circuit within the resonant circuit unit, when the contact pressure of the conductive tip is lower than the preset threshold, and
wherein the switch unit forms the resonant circuit, when the contact pressure of the conductive tip is equal to or higher than the preset threshold.

17. A coordinate measurement apparatus for determining a position of a contact object corresponding to at least one of a coordinate indicating apparatus and a finger, the coordinate measurement apparatus comprising:
a channel electrode unit including at least one transmission electrode and at least one reception electrode; and
a controller configured to:
measure a signal outputted from each of the at least one reception electrode,
determine whether the contact object is touched on the coordinate measurement apparatus based on a change in the signal outputted from each of the at least one reception electrode, and
identify a type of the contact object based on whether a reception signal from the coordinate indicating apparatus is detected through the at least one reception electrode,
wherein the at least one transmission electrode transmits an electrical transmission signal, and
wherein the reception signal is generated from a resonance of the coordinate indicating apparatus by using the transmitted electrical transmission signal.

18. The coordinate measurement apparatus of claim 17, wherein the controller is further configured to determine input positions of the coordinate indicating apparatus or the finger based on the signal outputted from each of the at least one reception electrode.

19. A coordinate indicating apparatus for inputting an input coordinate into a coordinate measurement apparatus having one or more electrodes, the coordinate indicating apparatus comprising:
a conductive tip configured to form a capacitance with the one or more electrodes; and
a resonant circuit unit configured to receive an electrical transmission signal from the coordinate measurement apparatus through the formed capacitance,
wherein the resonant circuit unit is connected to the conductive tip,
wherein the resonant circuit unit is further configured to:
produce resonance by using the electrical transmission signal, and
transmit a reception signal, and
wherein the reception signal is generated from the resonance.

20. A coordinate measurement system comprising:
a coordinate indicating apparatus; and
a coordinate measurement apparatus configured to determine a position of the coordinate indicating apparatus,
wherein the coordinate measurement apparatus comprises:
a channel electrode unit including at least one transmission electrode and at least one reception electrode, wherein the at least one transmission electrode transmits an electrical transmission signal;
a receiver configured to receive a reception signal through the at least one reception electrode; and
a controller configured to determine a contact pressure of the coordinate indicating apparatus,
wherein the coordinate indicating apparatus comprises:
a conductive tip configured to exchange the electrical transmission signal and the reception signal with the channel electrode unit, wherein the conductive tip forms a capacitance with the channel electrode unit;
a switch unit, wherein an on/off state of the switch unit is determined according to whether the coordinate indicating apparatus contacts the coordinate measurement apparatus; and
a passive circuit connected to the conductive tip,
wherein the reception signal is changed according to the state of the switch unit,
wherein the controller is further configured to:
measure the state of the switch unit based on the reception signal in two or more different sections of a same period,
wherein the passive circuit transmits the reception signal corresponding to the electrical transmission signal, and
wherein the reception signal is generated from resonance of the coordinate indicating apparatus by using the electrical transmission signal.

21. The coordinate measurement system of claim 20, wherein the controller is further configured to measure the state of the switch unit based on an integration result of a detection value of the reception signal in the two or more different sections of the same period.

22. A coordinate measurement system comprising:
a coordinate indicating apparatus; and
a coordinate measurement apparatus configured to determine a position of a contact object corresponding to at least one of the coordinate indicating apparatus and a finger,
wherein the coordinate measurement apparatus comprises:
a channel electrode unit including one or more electrodes, at least one of the one or more electrodes transmits an electrical transmission signal; and
a controller configured to measure a reception signal received through the channel electrode unit,
wherein the coordinate indicating apparatus comprises:
a conductive tip configured to form a capacitance with the one or more electrodes;
a grounding unit configured to form an electrical connection with a user through at least one of a direct contact and a capacitance; and
a resonant circuit disposed between the conductive tip and the grounding unit,
wherein the resonant circuit transmits the reception signal corresponding to the electrical transmission signal,
wherein the controller is further configured to calculate the position of the coordinate indicating apparatus based on relative amplitudes of the reception signal, and
wherein the resonant circuit produces resonance by using the electrical transmission signal, and the reception signal is generated from the resonance.

23. A coordinate measurement system comprising:
a coordinate indicating apparatus; and
a coordinate measurement apparatus configured to determine a position of a contact object including the coordinate indicating apparatus, wherein the coordinate measurement apparatus comprises:
- a channel electrode unit including one or more channel electrodes, wherein at least one of the one or more channel electrodes transmits an electrical transmission signal;
- a driver configured to apply a first electrical signal to the at least one of the one or more channel electrodes of the channel electrode unit to transmit the electrical transmission signal;
- a receiver configured to receive a second electrical signal from the channel electrode unit; and
- a controller configured to determine the position of the coordinate indicating apparatus, wherein the coordinate indicating apparatus comprises:
- a conductive tip configured to form a capacitance with the one or more channel electrodes of the channel electrode unit;
- a passive resonant circuit unit configured to receive the electrical transmission signal through the capacitance between the one or more channel electrodes of the channel electrode unit and the conductive tip; and
- a grounding unit configured to form an electrical connection with a user through at least one of a direct contact and the capacitance, wherein the passive resonant circuit unit transmits a reception signal corresponding to the electrical transmission signal, and wherein the passive resonant circuit unit produces resonance by using the electrical transmission signal, and wherein the reception signal is generated from the resonance.

24. The coordinate measurement system of claim 23, wherein the controller is further configured to measure the position of the contact object based on a relative size of received resonance signals received through the one or more channel electrodes.

25. A coordinate measurement system comprising:
a coordinate indicating apparatus;
a coordinate measurement apparatus configured to determine a position of a contact object including the coordinate indicating apparatus,
wherein the coordinate measurement apparatus comprises:
- a channel electrode unit including one or more electrodes, wherein at least one of the one or more electrodes transmits an electrical transmission signal; and
- a receiver configured to receive a reception signal through the channel electrode unit; and
a controller configured to determine the position of the coordinate indicating apparatus,
wherein the coordinate indicating apparatus comprises:
- a conductive tip configured to form capacitance with the one or more electrodes of the channel electrode unit;
- a passive resonant circuit unit configured to receive the electrical transmission signal through the capacitance formed between the one or more electrodes of the channel electrode unit and the conductive tip; and
- a grounding unit configured to form an electrical connection with a user through at least one of a direct contact and a capacitance, wherein the passive resonant circuit unit transmits the reception signal corresponding to the electrical transmission signal, wherein the passive resonant circuit unit produces resonance by using the electrical transmission signal, and wherein the reception signal is generated from the resonance.

26. The coordinate measurement system of claim 25, wherein the controller is further configured to measure the position of the coordinate indicating apparatus based on a relative amplitude of a resonance signal received through the one or more electrodes.

* * * * *